April 14, 1953     W. R. PETERSON     2,634,706
CHARGE DELIVERING HOPPER AND TROUGH Filed Jan. 14, 1950

INVENTOR
WALTER R. PETERSON
ATT'Y

Patented Apr. 14, 1953

2,634,706

UNITED STATES PATENT OFFICE 2,634,706

CHARGE DELIVERING HOPPER AND TROUGH

Walter R. Peterson, Hinsdale, Ill., assignor to International Harvester Company, a corporation of New Jersey Application January 14, 1950, Serial No. 138,630

5 Claims. (Cl. 119—56)

This invention relates to improvements in measuring and feeding machines for dry materials, and more particularly to machines designed to simultaneously measure and feed predetermined quantities of different materials to a common discharge trough.

It is oftentimes desirable to be able to feed a plurality of different kinds of solid materials in different measured quantities of each material to a common or single discharge receptacle. Such is the case in the agricultural field wherein the feed mixture for the various farm animals is made up of certain proportions of various ingredients. Hence it is the principal object of this invention to provide an improved machine which simultaneously and automatically delivers predetermined quantities of different materials to a common discharge trough.

A further object is the provision of an automatic, simple and inexpensive means for individually controlling the quantities of each particular material delivered to the discharge trough.

A still further object is the provision of a novel drive mechanism for operating measuring and feeding machines.

Another object is to provide a plurality of measuring and discharging members slidable within the compartments which contain the materials.

The foregoing and other important objects and desirable features inherent in and encompassed by the invention together with many of the purposes and uses thereof will become readily apparent from a reading of the ensuing description in conjunction with the annexed drawings in which.

Figure 1:
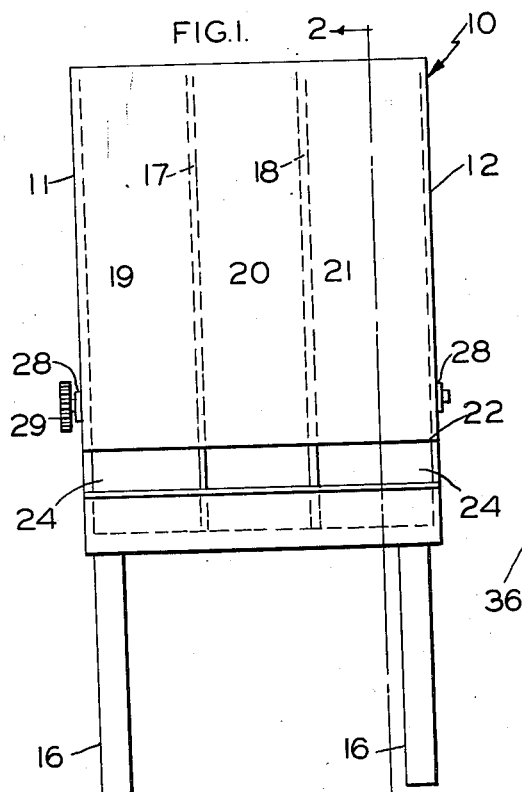
Fig. 1 is a front elevational view of the invention.

Referring to the drawings in which like reference characters designate like elements throughout the various views, there is shown a measuring and feeding machine having a hopper 10. The hopper 10 has a pair of oppositely facing, spaced side walls 11, 12 fastened to a pair of longitudinally spaced end walls 13, 14. A bottom wall 15 is rigidly attached to the lower marginal edges of the side walls 11 and 12. The bottom wall 15 is inclined downwardly to the left as viewed in Fig. 2 for a purpose which will be explained hereinafter.

The hopper 10 is supported off the floor in a convenient operating position by means of a plurality of vertically extending spaced upright members 16 rigidly connected to the hopper 10. Positioned within and attached to the hopper 10 are a pair of transversely spaced vertically disposed partitions 17, 18 which extend to the bottom wall 15 to form three compartments 19, 20, 21 for separately containing different dry materials. Inasmuch as the lower marginal edges 22, 23 of the end walls 13, 14 respectively do not extend to the bottom wall 15 but are vertically spaced therefrom it will be apparent that each compartment 19, 20, 21 is provided with a pair of longitudinally spaced vertically disposed openings 24 and 25.

Slidably supported within each compartment 19, 20, 21 is a measuring and discharging member or plunger 26. The plungers 26 are the same length and are each adapted to extend through the openings 24 and 25 of one of the compartments concurrently. The cross sectional area of each plunger is such that the plungers are capable of substantially closing the openings 24 and 25. The plungers 26 are prevented from moving transversely and vertically by the side walls 11, 12 and partitions 17, 18 and by the bottom wall 15 and the lower marginal edges 22, 23 of the end walls 13, 14 respectively. It will be appreciated, therefore, that movement of the plungers 26 to the right as viewed in Fig. 2 will uncover openings 24 in the compartments and allow a quantity of the materials supported on the plungers to drop to the bottom wall 15. Return movement to the left as viewed in Fig. 2 will push the quantities of materials from the compartments through the openings 24. Obviously the further the plungers move away from the openings 24 the greater will be the volumetric discharge of materials from the compartments.

In order to actuate the plungers to open and close the openings 24 a transversely extending shaft 27 is journaled in a pair of spaced bearing members 28 rigidly fastened to the side walls 11 and 12. One end of the shaft 27 is provided with a pulley 29 for receiving rotational movement from a conventional source of power such as a farm tractor power take-off shaft (not shown). The shaft 27 is further provided with an eccentric portion 30 intermediate its ends. Each plunger 26 has a bearing strap 31 rigidly attached thereto adjacent the end wall 14. Supported on the eccentric portion 30 are a plurality of spaced cam members 32, each of the cam members being encompassed by one of the bearing strap members 31. Hence rotation of the shaft 27, the eccentric portion 30, and the cam members 32 mounted thereon will cause reciprocation of the plungers 26.

Figure 3:
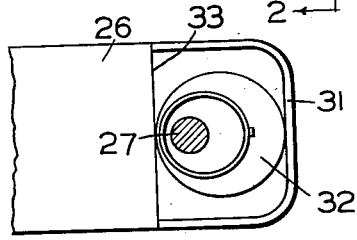
Fig. 3 is an enlarged detail view of an adjustable cam member positioned for maximum discharge.
Figure 4:
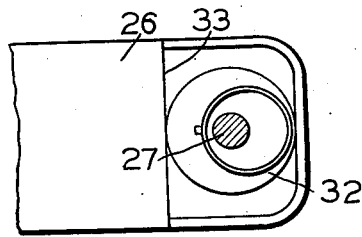
Fig. 4 is an enlarged view similar to Fig. 3 except that the positioning of the cam member is such that the rotation of the drive shaft will not actuate the measuring and discharging members associated therewith.
Figure 5:
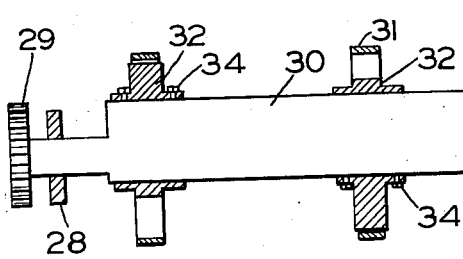
Fig. 5 is an enlarged cross sectional view taken substantially along line 5—5 of Fig. 2 showing the cam members mounted on the drive shaft.

The distance each plunger 26 moves away from its associated discharge opening during one revolution of the shaft 27 may be varied through a range from zero to maximum distance. It will be evident the distance the plunger 26 moves is entirely dependent on the degree of eccentricity resulting from the positioning of the cam member 32 on the eccentric portion 30. Referring to Fig. 3, the cam member 32 is shown adjusted with respect to the eccentric portion 30 to move the plunger 26 associated therewith the maximum distance. It will be noted that the throw of the cam member 32 is greatest in this position of adjustment. In Fig. 4 the plunger 26 will not move when the shaft 27 is rotated since the distance from the rotational axis of the shaft 27 to any point on the periphery or bearing surface of the cam member 32 is the same. Inasmuch as the discharge openings 24 must be maintained in their closed condition when the cam members 32 are adjusted to result in non-movement of the plungers 26 the distance from the rotational axis of the shaft 27 to the forwardly, facing surface 33 of the plungers must be greater than the distance from the discharge openings 24 to the rotational axis when the cam members 32 are adjusted as shown in Fig. 4.

Figure 2:
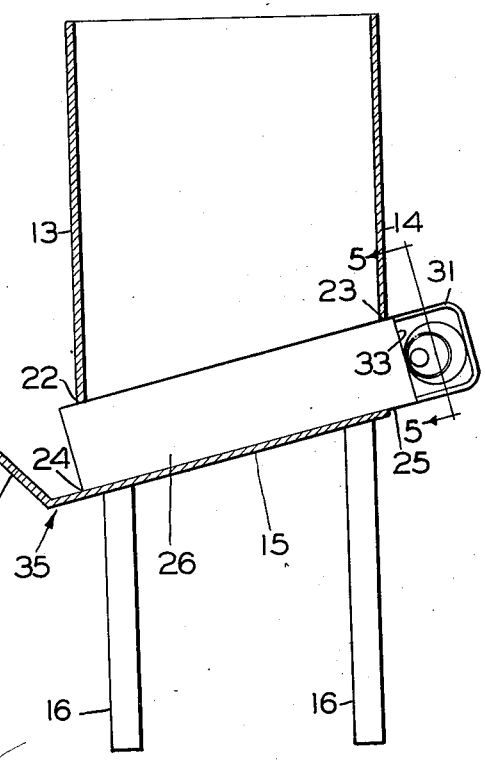
Fig. 2 is a cross sectional view taken substantially along line 2—2 of Fig. 1.

In operation each compartment is filled with one of the materials of the contemplated measured mixture. The cam members 32 are individually adjusted to get the desired proportion of materials by loosening set screws 34 located in the hub portion 37 of each cam member and rotating the cam members with respect to the eccentric portion 30. Thereafter the set screws 34 are tightened to key the cam members to the eccentric portion and the machine is ready to be operated. In order to receive the output of each compartment a discharge trough 35 is positioned adjacent the discharge openings 24. The trough 35 may be, as shown in Fig. 2, an upturned portion 36 of the bottom wall 15. The bottom wall 15 is inclined downwardly as viewed in Fig. 2 to facilitate the gravity flow of materials within the compartment to the bottom wall and the discharge thereof by the plungers 26.

The embodiment of the invention chosen for the purposes of illustration and description herein is that preferred for achieving the objects of the invention and developing the utility thereof in the most desirable manner, due regard being had to the improvement sought to be effected. It will be appreciated, therefore, that the particular structural and functional aspects emphasized herein are not intended to exclude but rather to suggest such other adaptations and modifications of the invention as fall within the spirit and scope of the invention as defined in the appended claims.

What is claimed is:

1. A dry material feeding and measuring machine comprising a hopper having an inclined bottom wall; a plurality of spaced, vertically disposed partitions within the hopper to define a plurality of compartments for separately containing different materials, each of said compartments having a vertically disposed discharge opening formed in one end wall thereof; a measuring and discharging member for each compartment slidably supported on said bottom wall normally closing the discharge opening associated therewith and supporting the material in the compartment off said bottom wall, said member being adapted to periodically move away from said discharge opening and allow the gravity flow of a quantity of material to said bottom wall and to return to close said discharge opening and discharge said quantity of material from said compartment, said members each being provided with a bearing strap member at one end; a drive means for periodically moving said measuring and discharging members including a rotatable shaft; individual adjusting means for varying the distance each measuring and discharging member moves away from the discharge opening associated therewith, said means including a cam member for each measuring and discharging member relatively adjustable with respect to said rotatable shaft, said cam members engageable with said bearing strap members; and discharge trough positioned adjacent said discharge openings to receive the materials discharged by said plungers.

2. A dry material measuring and feeding machine comprising a plurality of horizontally spaced compartments for separately containing different materials, each of said compartments having a vertically disposed discharge opening formed in one end wall thereof and a bottom wall inclined downwardly toward said discharge openings; a measuring and discharging plunger for each compartment slidably supported on said bottom wall normally closing the discharge opening associated therewith and supporting the material in the compartment off said bottom wall, said plunger being adapted to periodically move away from said discharge opening to measure a quantity of material and to return to close said discharge opening and discharge said measured quantity of material from said compartment, said plungers each being provided with a bearing strap member at one end; drive means for periodically moving said plungers including a rotatable shaft having an eccentric portion drivingly connected to said straps; individual adjusting means for varying the distance each plunger periodically moves away from the discharge opening associated therewith; said means including a cam member for each plunger relatively adjustable with respect to said eccentric portion, and a discharge trough positioned adjacent said discharge openings to receive the materials discharged by said plungers.

3. A dry material feeding and measuring machine comprising a plurality of spaced compartments for separately containing different materials, each of said compartments having a vertically disposed outlet opening and a downwardly sloping bottom wall; a plunger within each compartment reciprocable over the bottom wall of said compartment normally closing the discharge opening associated therewith and supporting the material in the compartment off said bottom wall; drive means to reciprocate said plungers whereby said plungers move away from said discharge openings to measure quantities of materials and return to close said discharge openings and discharge said measured quantities of materials, said drive means including a rotatable shaft having connection means engageable with said plungers; and means for adjusting said connection means for varying the stroke of each plunger individually including cam members relatively rotatable with respect to said rotatable shaft.

4. A dry material feeding and measuring machine comprising a hopper having an inclined bottom wall; a plurality of spaced, vertically disposed partitions within the hopper to define a plurality of compartments for separately containing different materials, each of said compartments having a vertically disposed opening formed in one end wall thereof; measuring and discharging means within said compartments normally closing said discharge openings and supporting the material in the compartments off said bottom wall; driving means for operably actuating said measuring and discharging means for opening said discharge opening and discharging material from said compartments; and adjustable means for varying the degree of actuation of said driving means for varying the quantity of materials discharged by said measuring and discharging means.

5. A material feeding and measuring machine comprising of spaced compartments for separately containing different materials, said compartments each having a discharge opening and a bottom wall; means operable within said compartments for measuring and discharging materials from the compartments through said discharge openings, said means including a plunger for each compartment slidably supported on said bottom wall, said plungers normally supporting the material in the compartments off said bottom wall; means for reciprocating said plungers including a rotatable shaft having an eccentric portion formed thereon, and a cam member for each plunger mounted on said eccentric portion adapted to drivingly engage said plungers; and means for adjusting said cam members individually with respect to said eccentric portion for selectively varying the ratio of different materials discharged from said compartments.

WALTER R. PETERSON.

References Cited in the file of this patent

UNITED STATES PATENTS

| Number | Name | Date |
|---|---|---|
| 1,176,016 | Anderson | Mar. 21, 1916 |

FOREIGN PATENTS

| Number | Country | Date |
|---|---|---|
| 161,380 | Germany | June 22, 1905 |
| 60,373 | Austria | July 25, 1913 |
| 76,194 | Austria | Apr. 25, 1919 |